United States Patent [19]

Liou

[11] Patent Number: 5,086,197
[45] Date of Patent: Feb. 4, 1992

[54] OPTICAL ENCODING METHOD AND DEVICE

[76] Inventor: Kwang-Wan Liou, 2F, No. 7, Lane 76, Pao An Street, Hsin Tien City, Taiwan

[21] Appl. No.: 583,608

[22] Filed: Sep. 17, 1990

[51] Int. Cl.$^5$ .................... G08C 21/00; G01V 9/04
[52] U.S. Cl. ..................................... 178/18; 250/566; 340/710
[58] Field of Search .................. 178/18, 19; 250/271, 250/566; 341/5; 350/502, 503, 504, 505; 340/710

[56] References Cited

U.S. PATENT DOCUMENTS 4,751,380  6/1988  Victor et al. .................. 340/710 X
4,880,967  11/1989  Fong et al. .................... 340/710 X Primary Examiner—Stafford D. Schreyer
Attorney, Agent, or Firm—Leonard Bloom

[57] ABSTRACT

An optical encoding means and device for magnifying, condensing, and encoding displacement information relative to an compound grid image sensed by a Photo Sensor Array. The device comprises a specific Grid Pad defined by vertical-horizontal coordinate lines along a plane and in a uniform color. The coordinate lines on the Grid Pad are magnified optically, and are then condensed along a horizontal and vertical axis by means of condenser lenses or reflective mirrors. The condensed image is projected on vertically and horizontally arranged Photo Sensors, and X-axial and Y-axial displacement information is generated by the Photo Sensor Array.

35 Claims, 5 Drawing Sheets

OPTICAL ENCODING METHOD AND DEVICE

FIELD OF THE INVENTION

The present invention relates to a method and device for sensing compound X-axis and Y-axis displacement relative to coordinate lines along a plane by means of image magnification and axial concentration. The invention serves as a man-machine interface using 2-dimensional displacement detection. It solves defects inherent in conventional devices such as complicated structure, susceptibility to clogging, poor accuracy, low resolution, etc.

BACKGROUND OF THE INVENTION

The art of 2-dimensional displacement detection has long been applied in industrial controls and computer input-output peripherals. Devices incorporating this technology have become essential equipment today. The accuracy for such devices has always been a design objective. For example, in the popularized PC, the conventional key-in operation has evolved into a simpler man-machine interface, and the CURSOR control and command input is accomplished by moving the hand on a track-ball in conjunction with WINDOWS TM software. Besides having remarkable impact in CAD and graphic softwares, such devices have become popular in commercial, educational, household and even TV game applications. This popularity is because the devices are economical, advantageous and convenient.

Most of above-mentioned conventional devices are of the mechanical frictional transmission-type n which a moving body drives an X-axial and Y-axial ENCODER, e.g. a ROTARY ENCODER. For example, a transmission shaft is frictionized with the plate top directly, or is geared to a ball; and displacement information is encoded by an X-axial and Y-axial ENCODER. However, these conventional devices incorporate a complicated structure requiring a plurality of transmission mechanisms and rather sophisticated arrangements for the mechanisms.

Moreover, rotation results in friction, and measurement of frictional displacement inevitably causes error. Therefore, the frictional transmission type device decreases the accuracy. Furthermore, since no material is wearproof, wear and tear will increase the erroneous measurement in accordance with the amount of use. In addition, the transmission shaft or ball may carry dust and dirt from the plate surface into the internal mechanism so that routine clean-up and maintenance is necessary to prevent a complete failure of operation.

In order to solve the above-mentioned defects found in conventional devices, the inventor has developed the present invention through careful design and accumulated experience in this field, together with many experiments and improvements thereon.

SUMMARY OF THE INVENTION

The object of the present invention is to provide an ENCODING method and related device having the advantage of a simple structure which eliminates frictional transmission, and increases accuracy and resolution.

The present invention is characterized by a reflective or permeable GRID PAD of equi-distant coordinate lines uniformly spaced at predetermined intervals, and a built-in mechanism including Lens Assembly and PHOTO SENSOR ARRAY which can be engaged in magnified and axial light gathering. When said Assembly and ARRAY are displaced, after optical magnification and axial gathering process, X-axial and Y-axial PHOTO SENSOR ARRAY may directly acquire output signals from the standard encoder without a complicated processing operation or frictive transmission.

In that light being refracted with a lens or reflected with a lens for guiding, gathering or diffusing is widely known, this and other essential but familiar accessories such as a power cord and cable for data transmission to any electrical appliances shall be omitted herein.

DETAILED DESCRIPTION OF THE PREFERRED EMBODIMENTS

Figures 1, 2:
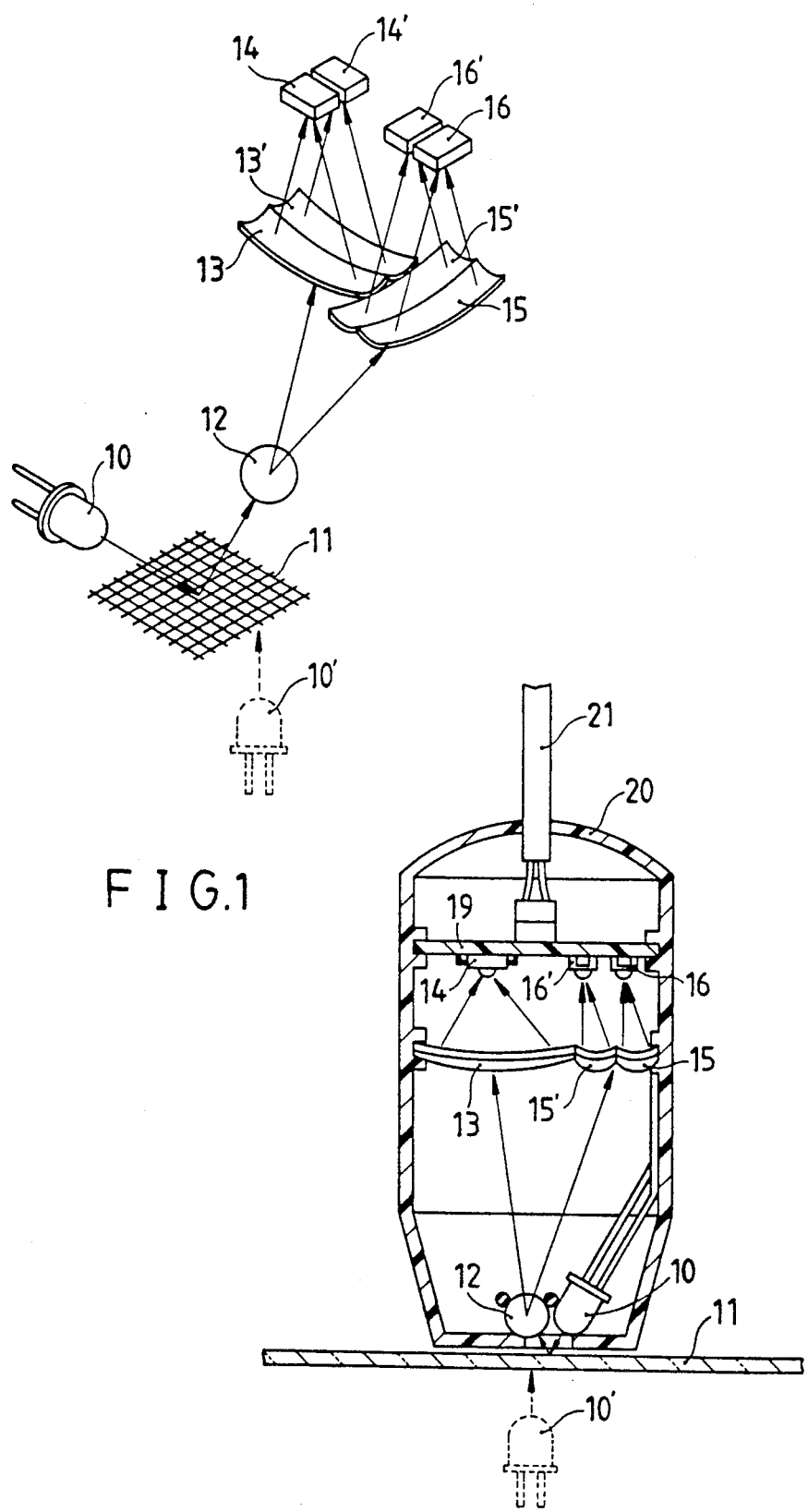
FIG. 1 is a view showing a condenser lens assembly as used according to the present invention.
FIG. 2 is a cross-sectional view of an optical lens assembly as used according to the present invention.

Referring to the drawings, the encoding principle according to the present invention may be practiced in different embodiments subject to the user's selection.

Referring to FIG. 1, the present invention employs a condenser lens 12. Also included is a light source 10 or 10' which is provided for projecting onto a Grid Pad 11. The light source is not limited with respect to color, wave length and shape, etc. A conventional LED is used herein as an example. The Grid Pad 11 in the present invention can be a reflective plate or light-permeable material, such as plastic or glass plate, printed with a grid thereon. When the Grid Pad 11 uses reflective material, the light source 10 is fixed within a lens assembly to project the light within the image zone of lens 12. The lens 12 is an imaging lens with the ability to condense the light in the front of lens 12 at the center and to form the image on the rear side of lens 12.

Figure 3:
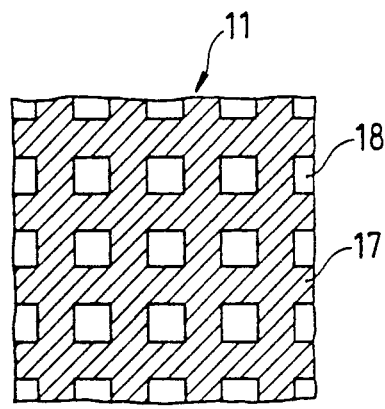
FIG. 3 is an enlarged partial top view of a Grid according to the present invention.
Figure 4:
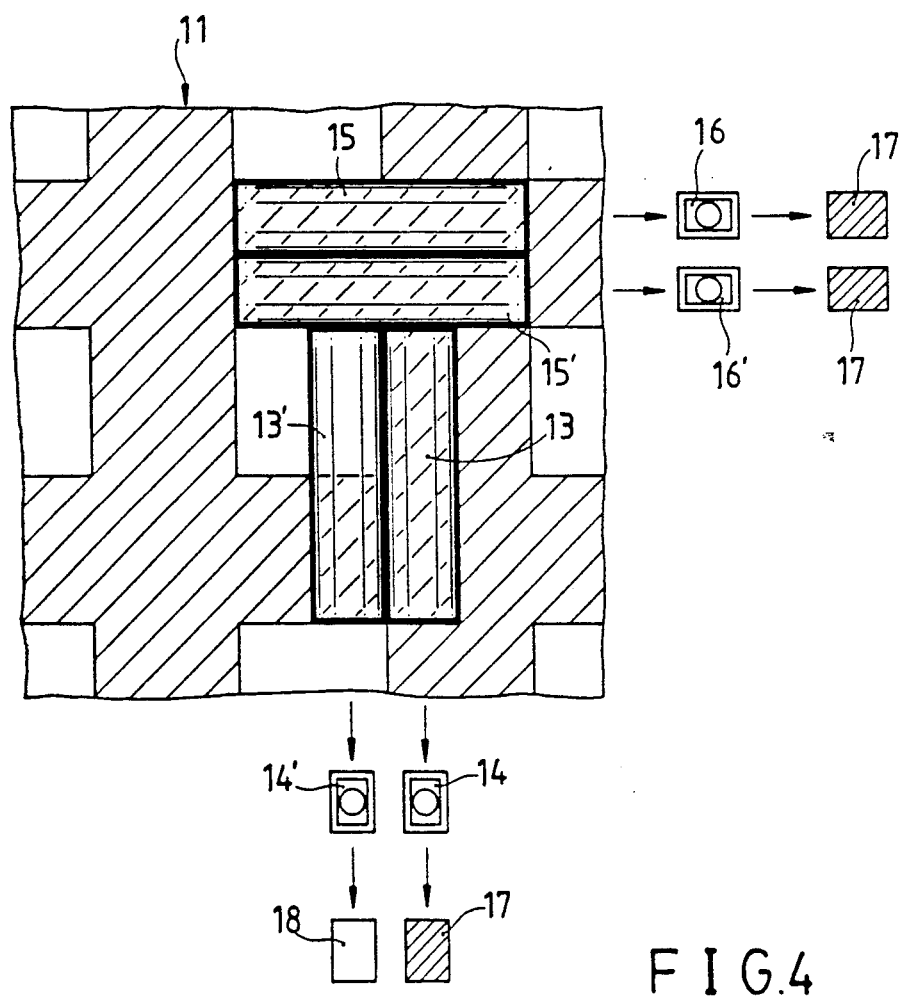
FIG. 4 is an enlarged view showing a condenser image area according to the present invention.

Through the imagery lens 12, optical image will be formed on the sections 13, 13', 15 and 15'. According to the formula Magnification M (magnification)=P (image distance)/S (object distance), make P (i.e. the spacing between imagery sections 13, 13', 15, 15' and the center of lens 12) greater than the object distance (i.e. the distance from the center of lens 12 to the surface of Grid Pad 11), therefore, the scale on the Grid Pad 11 can be magnified. Referring to FIG. 3 and 4, the shaded section 17 is the shadow of coordinate lines on the Grid Pad 11, and the blank sections 18 are the spacing between coordinate lines on the Grid Pad 11 through which the light sources 10 and 10' project. The width and spacing of each coordinate line can be set to correspond to an imagery area covered by the rectangular condenser lens 13, 13', 15, 15' as shown in FIG. 4. Those axially aligned condenser lenses can be lined up side by side or across one block. Now the area covered by each piece of condenser len is defined as "convergent plane", and the focal point of each condenser len 5 should correspond to at least one photo sensor 14, 14". Referring to FIG. 1, the condenser lens 13, 13' fully focus the light in the convergent plane that they cover onto the Photo Sensor Array 14, 14', and the condenser lens 15, 15' focus the light onto Photo Sensor Array 16, 16'. Referring to FIG. 4, an exemplary focusing condition is apparent when no illumination exists in the convergent plane of condenser lens 13, 13', 15, 15' corresponding to Photo Sensor Array 14, 14', 16, 16', or merely minor parts of convergent planes are illuminated, the surface of Photo Sensor Array may receive too weak light or no light, and the output is defined as signal "0". However, as shown, when one half of the convergent plane corresponding to the Sensor Array 16' is illuminated so the status of sensor 16' is changed and such a status is defined as signal "1".

Referring to FIG. 2, a device 20 is shown incorporating the embodiment of FIG. 1 in a housing containing the imagery lens 12, the condenser lens assemblies 13, 13', 15, 15'. Photo Sensor Array 14, 14', 16, 16', and necessary electrical components 19 and cords 21 for electronic circuits. Device 20 is completely separate from the Grid Pad 11. When any relative displacement occurs between the device 20 and Grid Pad 11, the image in the front of imagery lens 12 shall be changed, and consequently the relationship between the illumination on the convergent plane and the shadow on the Grid Pad as shown in FIG. 4 shall be changed accordingly. A X-axial displacement is described hereunder as an example.

Figure 5:
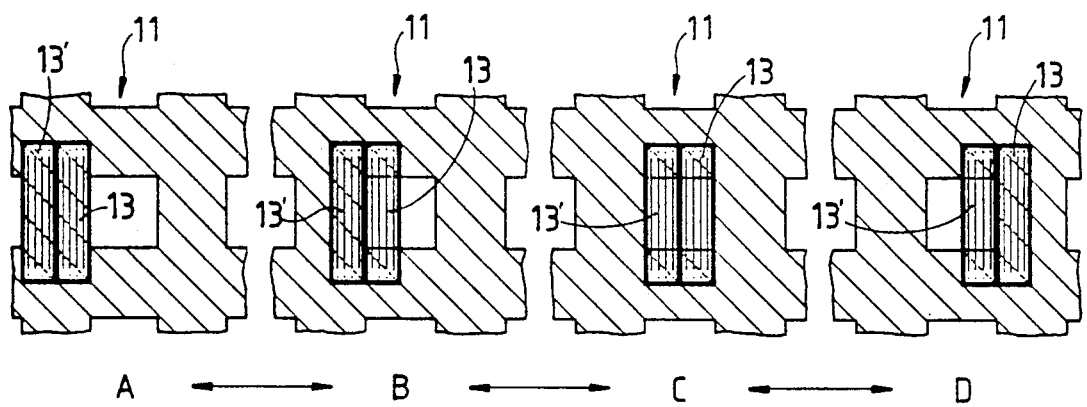
FIG. 5 is a diagram showing the variation of monoaxial displacement signals according to the present invention.

Referring to FIG. 5, a single axial displacement sequence according to the present invention is shown in which a horizontal (X-axial) displacement is made between the device 20 and the Grid Pad 11, and successive signals A, B, C, D, etc. are generated in sequence as the device 20 is moved right or left along Grid Pad 11.

Using signals "1", "0" previously defined for the bright/shadow images received by said Photo Sensor Array 14, 14', 16, 16', when convergent planes 15, 15, displace, the following signal combinations can be obtained from the Photo Sensor Array 16, 16'. If the displacement is from status A to status B, the signal combination is changed from [0,0] to [0,1]. If displacement is continued rightward through status D, it will return to status A. The status changes according to a cyclical relationship and the following combinational relationship is obtained:

```
                (A)
               [0, 0]
    (D)                   (B)
         [1, 0]      [0, 1]
                (C)
               [1, 1]
```

Such a combinational relationship comprises signals which conform to a conventional and standard encoder. However, what should be noted is that, when the machine 20 or Grid Pad 11 is merely engaged in monoaxial displacement, then the other axial status will not be affected by such motion at all.

Figure 6:
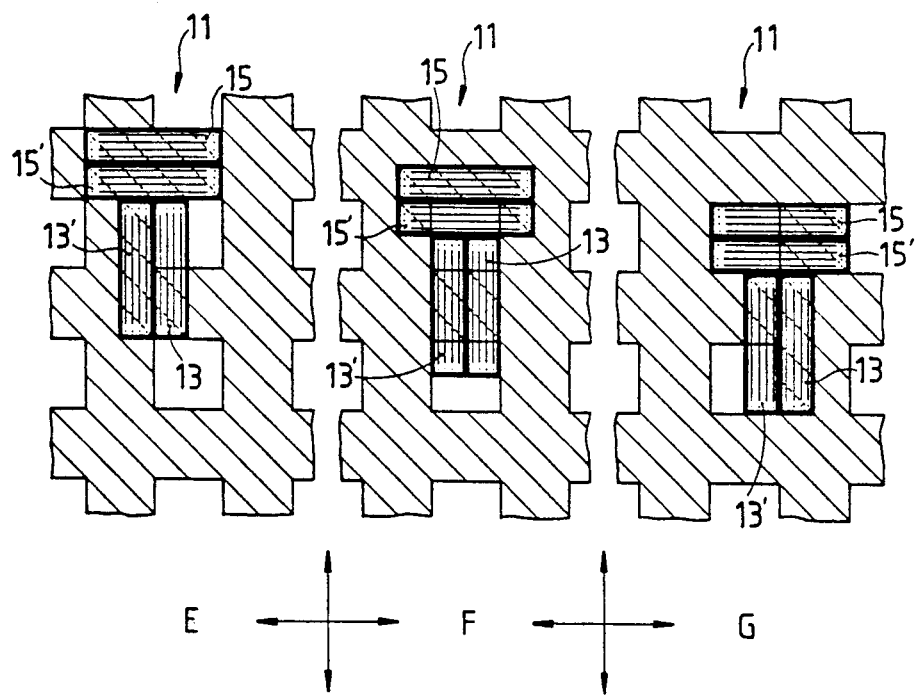
FIG. 6 is a diagram showing the variation of biaxial displacement signals according to the present invention.

When the device 20 and Grid Pad 11 are engaged both in X-axial and Y-axial displacements as shown in FIG. 6, the device 20 is displaced toward the right bottom from status E to status F, and the combination is changed from [1,1] to [1,0]. At this moment Photo Sensor Array may read out the state of detection from X-axial and Y-axial output signals.

Figure 7:
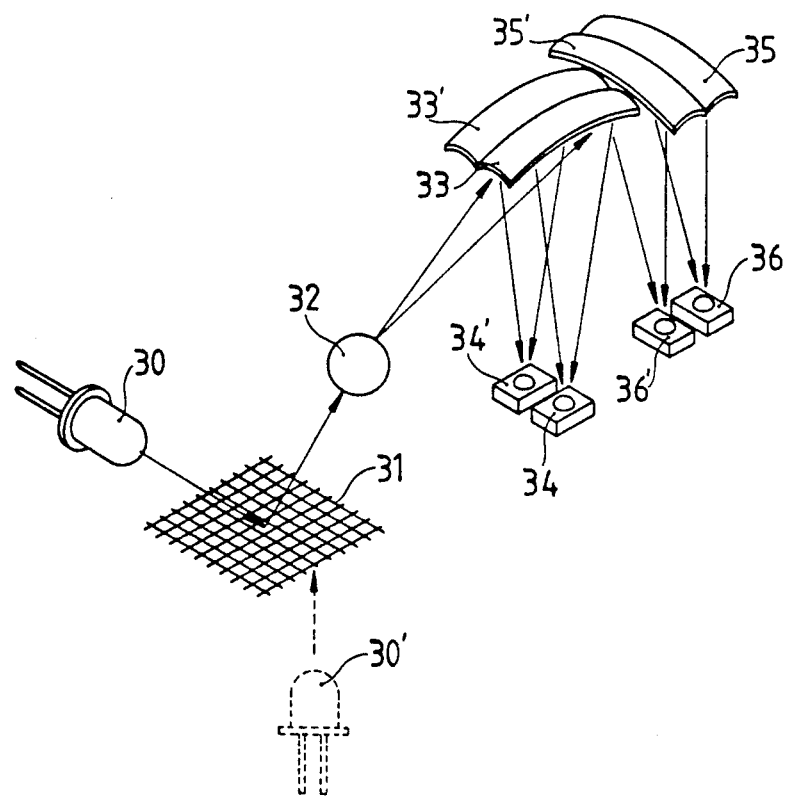
FIG. 7 is a view showing a condensing reflective mirror assembly as used according to the present invention.
Figure 8:
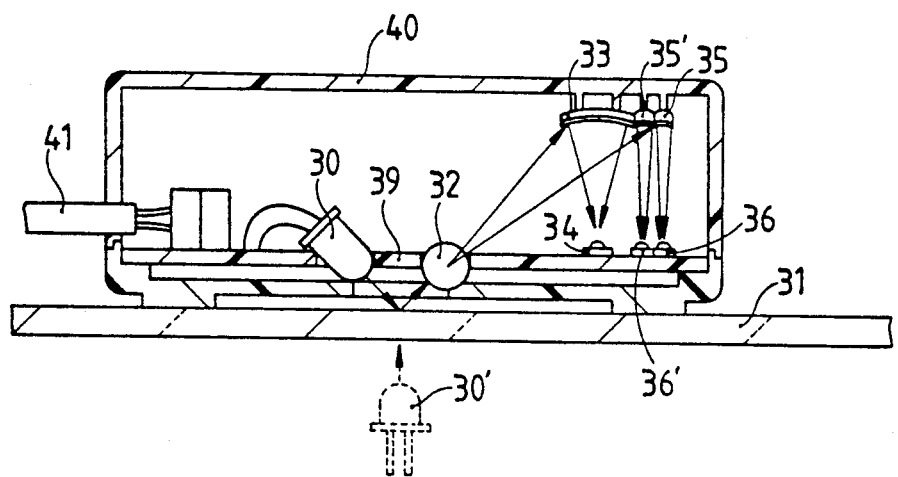
FIG. 8 is a cross-sectional view showing a condensing reflective mirror assembly as used according to the present invention.

In another embodiment of the present invention, reflective mirrors are used for condensing. Referring to FIG. 7 and 8, this embodiment operates according to the same principle, and light source 30 or 30', Grid Pad 31, lens 32, Photo Sensor Array 34, 34', 36, 36' and circuit components 39 and machine 40 are the same. However, instead of condensing lens, raise-up type reflective lens 33, 33', 35, 35' are used.

Figure 9:
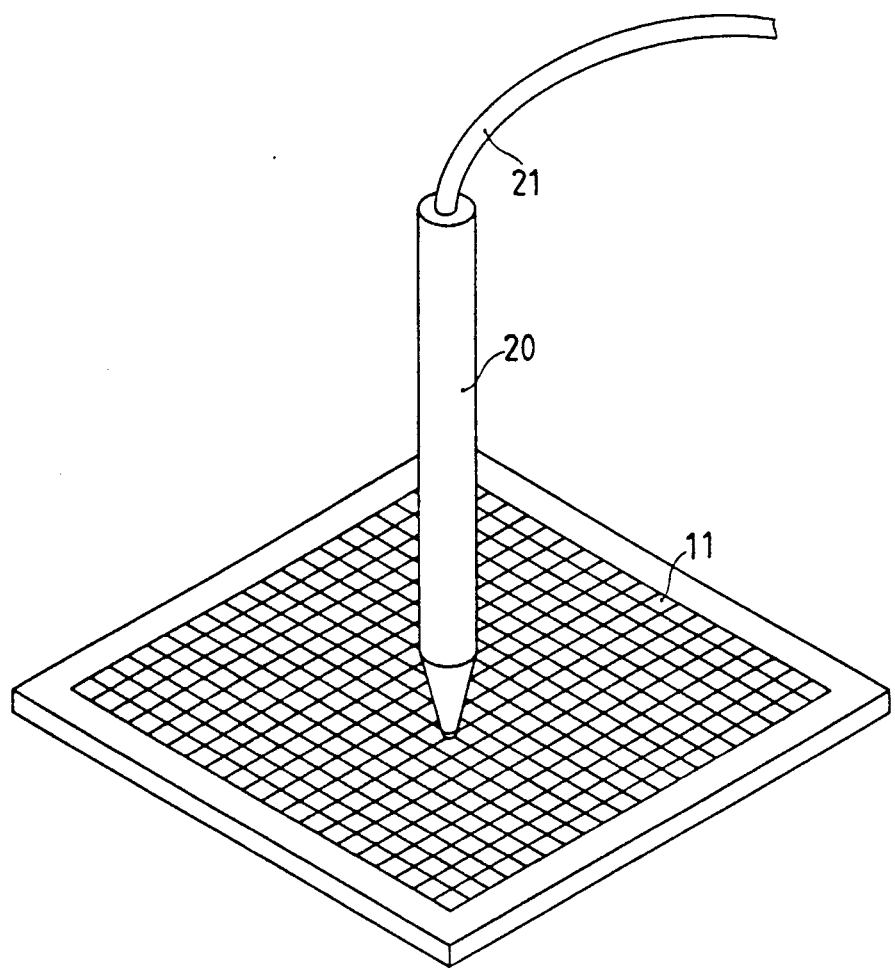
FIG. 9 is a respective view of one embodiment of the present invention.
Figure 10:
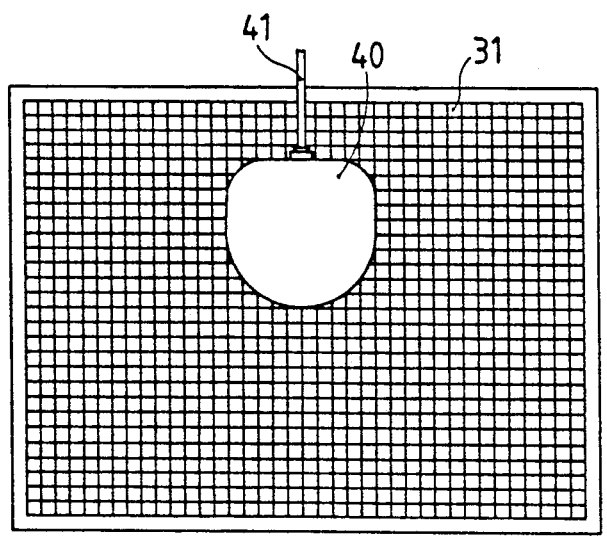
FIG. 10 is a respective view of another embodiment of the present invention.

As the beam of light may be directed in any direction as guided by refractive or reflective lenses, the present invention is not limited to any particular shape or combination of lenses, and a permeable condenser lens may be used along one axis while reflective condenser lens is used along the other axis. The number of possible embodiments may reach 16 ($4^2$). When the refractive condensing lens is used, the imagery section is located on top and the devices is more suited to vertical or rectangular design, such as the embodiment shown in FIG. 9. When the reflective condenser lens is used, a larger transverse section is required and it is more suitable to horizontal design, such as the embodiment shown in FIG. 10.

The image of Grid Pad 11 is magnified and then focused on Photo Sensor Array 14, 14', 16, 16' by means of condenser lens or reflective mirrors. In consideration of economizing the 10 production cost, Photo Sensor Array 14, 14', 16, 16' may be Photo-Transistors or Photo-Diodes, the substantial area on which the light shines being about 20 $MIL^2$ in general. If the image is magnified by 200X, the coordinate line width (being wide enough to cover the width of two pieces of condenser lens or reflective lens) shall be 20 MIL only after magnification, i.e. the width of coordinate lines on Grid Pad 11 is 10 MIL and spacing is 10 MIL so that there are 1000/20=50 scale marks within each inch of Grid Pad 11. Since 4 convergent planes occur from the scale mark to the other, the accuracy can reach 200 D.P.I. If magnification reaches 12, accuracy may reach 1200 D.P.I. Such resolution is well beyond the capabilities of the conventional encoder.

Moreover, neither Grid Pad 11 nor any other component requires special precision, and no special manufacturing techniques are required. Grid Pad 11 can be manufactured by photo exposure or evaporative plating according to existing industrial methods.

The present invention provides a means and device heretofore undisclosed in the prior art, and has the advantage of a simple structure, incorporating high accuracy and resolution. And what's more important is that the output provided by the present invention is compatible with the conventional and standard encoder output, hence no complicated and time-wasting conversion operations are required, and it will not reduce the reactive speed of encoder.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. An optical encoding device for providing an operator interface with a machine, comprising;
    a reflective Grid Pad having a plurality of coordinate lines arranged along an x-axis and y-axis;
    imaging means for providing information indicative of a relative displacement of said imaging means with respect to said Grid Pad, said imaging means further comprising,
        a light source for forming an image of said coordinate lines when light from said light source is reflected from the Grid Pad,
        an imaging lens for magnifying said image,
        a plurality of light-sensors each for providing a threshold measure of illumination, and
        a plurality of axially aligned condensers each for condensing a fragment of said image onto one of said light-sensors, and
        an encoder connected to said light-sensors for encoding said measures of illumination into information indicative of a relative displacement of said imaging means with respect to said Grid Pad.

2. The optical encoding device according to claim 1, wherein said condensers are refractive lenses.

3. The optical encoding device according to claim 1, wherein said condensers are reflective lenses.

4. The optical encoding device according to claim 1, wherein said condensers are a combination of reflective AND refractive lenses.

5. The optical encoding device according to claim 1, wherein a distance from said Grid Pad to a center of said imaging lens is shorter than a distance from said center of the imaging lens to said condensers for magnifying said image and increasing resolution.

6. The optical encoding device according to claim 1, wherein said plurality of coordinate lines are of uniform width, said lines being arranged along the x-axis and y-axis so that a distance between said lines is equal to said width of said lines.

7. The optical encoding device according to claim 1, wherein said plurality of condensers further comprises four condensers, and said plurality of light-sensors further comprises a first pair of light-sensors axially arranged along said x-axis, and a second pair of light-sensors axially arranged along said y-axis.

8. The optical encoding device according to claim 7, wherein said condensers each condense a quadrant of said image onto a corresponding one of said light sensors.

9. The optical encoding device according to claim 8, wherein said encoder encodes said measures of illumination from said first pair of sensors into information indicative of said relative displacement along said x-axis, and said encoder encodes said measures of illumination from said second pair of sensors into information indicative of said relative displacement along said Y-axis.

10. An optical encoding device for providing an operator interface with a machine, comprising;
    a translucent Grid Pad having a plurality of coordinate lines arranged along an x-axis and y-axis;
    a light source for forming an image of said coordinate lines when light from said light source is transmitted through the Grid Pad,
    imaging means for providing information indicative of a relative displacement of said imaging means with respect to said Grid Pad, said imaging means further comprising,
        an imaging lens for magnifying said image,
        a plurality of light-sensors each for providing a threshold measure of illumination, and
        a plurality of axially aligned condensers each for condensing a fragment of said image onto one of said light-sensors, and
        an encoder connected to said light-sensors for encoding said measures of illumination into information indicative of a relative displacement of said imaging means with respect to said Grid Pad.

11. The optical encoding device according to claim 10, wherein said condensers are refractive lenses.

12. The optical encoding device according to claim 10, wherein said condensers are reflective lenses.

13. The optical encoding device according to claim 10, wherein said condensers are a combination of reflective and refractive lenses.

14. The optical encoding device according to claim 10, wherein a distance from said Grid Pad to a center of said imaging lens is shorter than a distance from said center of the imaging lens to said condensers for magnifying said image and increasing resolution.

15. The optical encoding device according to claim 10, wherein said plurality of coordinate lines are of uniform width, said lines being arranged along the x-axis and y-axis so that a distance between said lines is equal to said width of said lines.

16. The optical encoding device according to claim 10, wherein said plurality of condensers further comprises four condensers, and said plurality of light-sensors further comprises a first pair of light-sensors axially arranged along said x-axis, and a second pair of light-sensors axially arranged along said y-axis.

17. The optical encoding device according to claim 16, wherein said condensers each condense a quadrant of said image onto a corresponding one of said light sensors.

18. The optical encoding device according to claim 17, wherein said encoder encodes said measures of illumination from said first pair of sensors into information indicative of said relative displacement along said x-axis, and said encoder encodes said measures of illumination from said second pair of sensors into information indicative of said relative displacement along said Y-axis.

19. An optical encoding device for controlling a cursor of a computer, comprising;
    a reflective Grid Pad having a plurality of coordinate lines arranged along an x-axis and y-axis; said plurality of coordinate lines being of uniform width, and said lines being arranged along the x-axis and y-axis so that a spacing between said lines is equal to said width of said lines;
    an optical mouse for providing information indicative of a relative displacement of said mouse with respect to said Grid Pad, said mouse further comprising,
        a light source for forming an image of said coordinate lines when light from said light source is reflected from the Grid Pad,
        an imaging lens for magnifying said image,
        a plurality of light-sensors each for providing a threshold measure of illumination, and a plurality of axially aligned condensers each for condensing a fragment of said image onto one of said light-sensors, and an encoder connected to said light-sensors for encoding said measures of illumination into information indicative of a relative displacement of said mouse with respect to said Grid Pad.

20. The optical encoding device according to claim 19, wherein said condensers are lenses.

21. The optical encoding device according to claim 19, wherein said condensers are reflective mirrors.

22. The optical encoding device according to claim 19, wherein said condensers are a combination of reflective mirrors and lenses.

23. The optical encoding device according to claim 19, wherein a distance from said Grid Pad to a center of said imaging lens is shorter than a distance from said center of the imaging lens to said condensers for magnifying said image and increasing resolution.

24. The optical encoding device according to claim 22, wherein said plurality of condensers further comprises four condensers, and said plurality of light-sensors further comprises a first pair of light-sensors axially arranged along said x-axis, and a second pair of light-sensors axially arranged along said y-axis.

25. The optical encoding device according to claim 24, wherein said condensers each condense a quadrant of said image onto a corresponding one of said light sensors.

26. The optical encoding device according to claim 25, wherein said encoder encodes said measures of illumination from said first pair of sensors into information indicative of said relative displacement along said x-axis, and said encoder encodes said measures of illumination from said second pair of sensors into information indicative of said relative displacement along said Y-axis.

27. An optical encoding device for providing an operator interface with a machine, comprising;

a translucent Grid Pad having a plurality of coordinate lines arranged along an x-axis and y-axis;

a light source for forming an image of said coordinate lines when light from said light source is transmitted through the Grid Pad, an optical mouse for providing information indicative of a relative displacement of said optical mouse with respect to said Grid Pad, said optical mouse further comprising, an imaging lens for magnifying said image, a plurality of light-sensors each for providing a threshold measure of illumination, and a plurality of axially aligned condensers each for condensing a fragment of said image onto one of said light-sensors, and an encoder connected to said light-sensors for encoding said measures of illumination into information indicative of a relative displacement of said imaging means with respect to said Grid Pad.

28. The optical encoding device according to claim 27, wherein said condensers are lenses.

29. The optical encoding device according to claim 27, wherein said condensers are reflective mirrors.

30. The optical encoding device according to claim 27, wherein said condensers are a combination of reflective mirrors and lenses.

31. The optical encoding device according to claim 27, wherein a distance from said Grid Pad to a center of said imaging lens is shorter than a distance from said center of the imaging lens to said condensers for magnifying said image and increasing resolution.

32. The optical encoding device according to claim 31, wherein said plurality of coordinate lines are of uniform width, said lines being arranged along the x-axis and y-axis so that a spacing between said lines is equal to said width of said lines.

33. The optical encoding device according to claim 32, wherein said plurality of condensers further comprises four condensers, and said plurality of light-sensors further comprises a first pair of light-sensors axially arranged along said x-axis, and a second pair of light-sensors axially arranged along said y-axis.

34. The optical encoding device according to claim 33, wherein said condensers each condense a quadrant of said image onto a corresponding one of said light sensors.

35. The optical encoding device according to claim 34, wherein said encoder encodes said measures of illumination from said first pair of sensors into information indicative of said relative displacement along said x-axis, and said encoder encodes aid measures of illumination from said second pair of sensors into information indicative of said relative displacement along said Y-axis.

* * * * *